United States Patent [19]

Steffan

[11] Patent Number: 4,598,878
[45] Date of Patent: Jul. 8, 1986

[54] MOTORIZED FISHING REEL

[76] Inventor: Walter J. Steffan, P.O. Box 116, Tygh Valley, Oreg. 97063

[21] Appl. No.: 586,310

[22] Filed: Mar. 5, 1984

[51] Int. Cl.$^4$ ............................................ A01K 89/017
[52] U.S. Cl. ..................................... 242/84.1 A; 43/21
[58] Field of Search .................. 242/84.1 A, 211–221; 43/21

[56] References Cited

U.S. PATENT DOCUMENTS

| | | | |
|---|---|---|---|
| 1,580,986 | 4/1926 | Aberson | 242/84.1 A |
| 2,262,637 | 11/1941 | Franshier | 242/84.1 A |
| 2,714,271 | 8/1955 | Stratton | 242/84.1 A |
| 3,030,046 | 4/1962 | Moghadam | 242/84.1 A |
| 3,077,318 | 2/1963 | Du Val | 242/84.1 |
| 3,126,166 | 3/1964 | Weinberg | 242/84.1 |
| 3,215,359 | 11/1965 | Sanders | 242/84.1 A |
| 3,460,778 | 8/1969 | Folbrecht | 242/84.2 |
| 3,979,081 | 9/1976 | Miyamae | 242/84.1 |
| 4,006,867 | 2/1977 | Miyamae | 242/84.1 |
| 4,021,003 | 5/1977 | Watkins | 242/84.1 A |

FOREIGN PATENT DOCUMENTS 36-8033  6/1961  Japan ............................ 242/84.1 A Primary Examiner—Billy S. Taylor
Attorney, Agent, or Firm—Eugene M. Eckelman

[57] ABSTRACT

A rotatable drive output is provided for a fishing reel and has a connecting gear for establishing a rotatable connection between the fishing reel spool shaft and the drive output. This drive connection is provided at the end of the reel opposite from the manually operating handle and is operably connected to an electric motor mounted on the reel or in a remote location with a flexible cable drive. In some embodiments, a microswitch is mounted on the reel body and is associated with a manually operable pivotal lever capable of operating the switch in an arrangement which causes engagement of the gear output and connecting gear prior to closing of the switch. In another embodiment, a fish line spool of the reel is provided that is hollow and the electric drive motor is supported in the hollow portion of this spool.

1 Claim, 16 Drawing Figures

MOTORIZED FISHING REEL

BACKGROUND OF THE INVENTION

This invention relates to new and useful improvements in motorized fishing reels and in particular relates to fishing reels of the type that are mounted on a fishing pole.

Most fishing reels now in prevalent use, including both casting and spinning type reels, have a hand crank on one end of the reel body for driving the spool shaft. Such shaft has suitable gearing for operation of the spool and this shaft projects through the opposite end for association with an auxiliary drag to prevent over-spinning of the spool when casting and also for lubrication. This latter end of the shaft is covered by a removable cap having abutting engagement against the shaft to provide a friction drag.

Motorized fishing reels have heretofore been provided but such power driven reels do not appear to have achieved commercial success. One inherent disadvantage of prior reels of this type is that the motors and gearing, as well as connecting structure, have been bulky and expensive. Thus, not only do the economics of the structure limit the exploitation of such a reel but the bulkiness thereof makes it unfeasible for a fisherman to handle a pole with such a reel installed thereon.

SUMMARY OF THE INVENTION

According to the present invention and forming a primary objective thereof, a motorized fishing reel is provided that is extemely compact in structure, light in weight, and inexpensive to manufacture.

Another object of the invention is to take advantage of modern motor units which are now very small in size and light in weight whereby such motors are adapted to be combined with structure of existing type fishing reels and in such combination are not materially heavier and bulkier than the usual manually operated reel.

Another advantage of the invention is to provide embodiments of the invention which take advantage of the structure of existing type fishing reels wherein power connection from a motor is operably associated with the auxiliary drag end of the spool shaft portion opposite from the manually operating hand.

Still another object is to provide a powered fishing reel having structure which is driven by a combined motor and battery pack arranged to be worn on the belt of a person and having a flexible cable drive to the reel.

Still another object is to provide a powered fishing reel having a hollow spool and a motor unit enclosed principally within the spool.

In carrying out the objectives of the invention, rotatable output means is employed having a shaft mounted gear output. This rotatable output in some embodiments of the invention comprises the output shaft of an electric motor mounted directly on the reel or in other embodiments it comprises a combination motor and battery pack carried on the person and connected to the output by a flexible cable. Mounting means mounts the rotatable output on the auxiliary drag end of the reel body, namely, the end opposite from the spool rotating handle, and connecting gear means are mounted on the spool shaft for establishing a connection between the shaft and the rotatable output means. Enclosure means mounted on the reel body encloses the rotatable output means, the mounting means therefor, and the connecting gear means. In some embodiments, a microswitch is mounted on the reel body and is associated with a manually operable pivotal lever capable of operating the switch in an arrangement which causes engagement of the gear output and connecting gear means prior to closing of the switch. In yet another embodiment, a fish line spool of the reel is provided that is hollow and the electric drive motor is supported in the hollow portion of this spool.

The invention will be better understood and additional objects and advantages will become apparent from the following description taken in connection with the accompanying drawings.

DETAILED DESCRIPTION OF PREFERRED EMBODIMENTS

Figure 1:
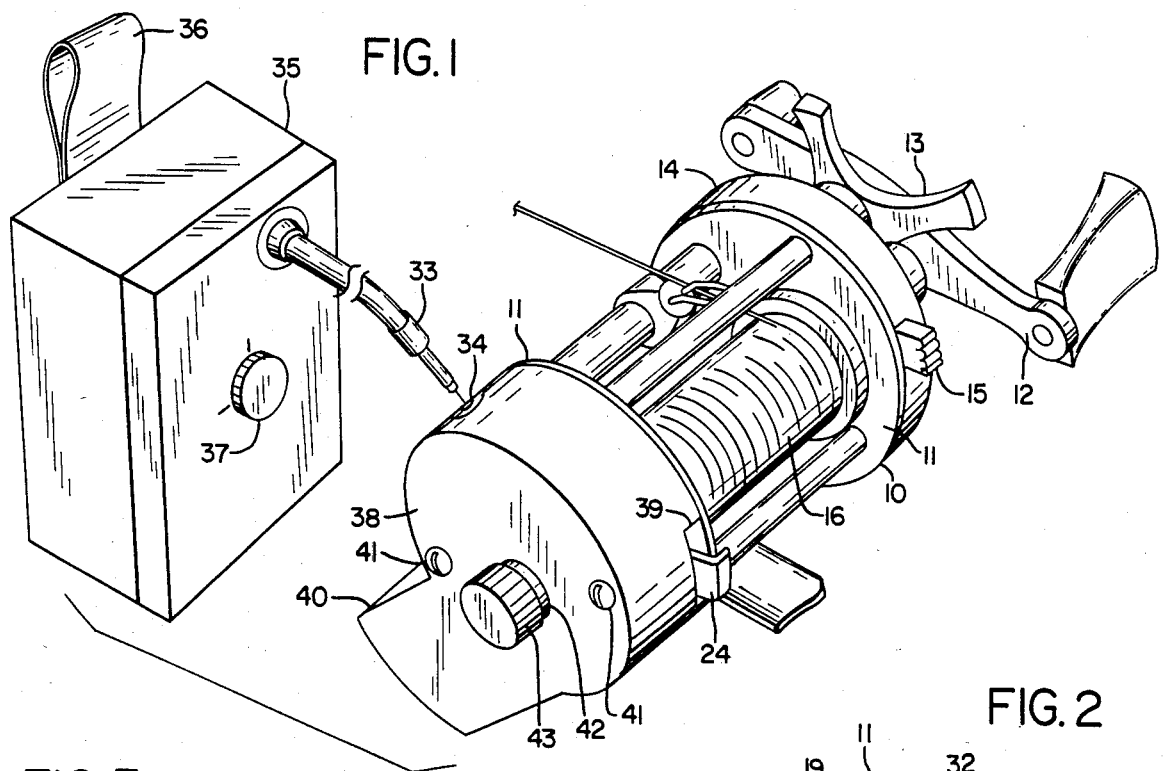
FIG. 1 is a perspective view of a first embodiment of a fishing reel incorporating features of the present invention.
Figure 3:
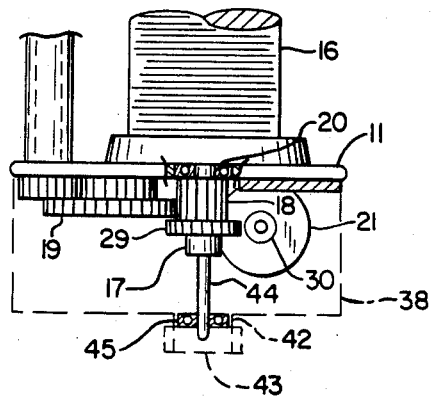
FIG. 3 is a sectional view taken on the line 3—3 of FIG. 2, some of the parts being omitted for clarity.
Figure 2:
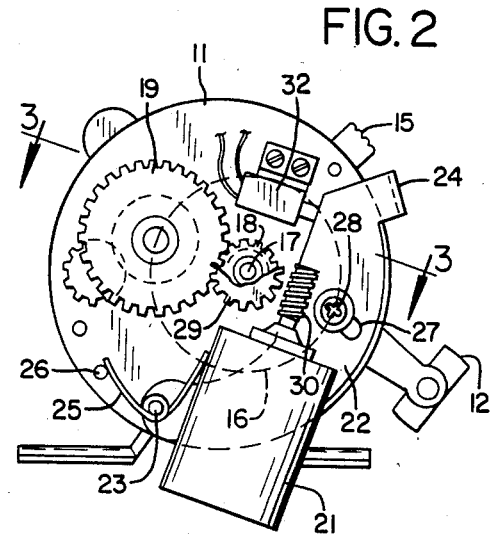
FIG. 2 is an end view taken from the left of FIG. 1 with an end enclosure of the reel removed to show internal structure.

With particular reference first to FIGS. 1-4, the numeral 10 designates a reel body having opposite ends 11 and also having the usual rotating handle 12, star wheel drag control 13, gear housing 14, and release button 15 which provides freewheeling of the fish line spool 16 generally by axial engagement and disengagement of the spool shaft and portions of the gearing in the housing 14. Spool 16 is supported on a shaft 17 having one one end connected into the gear housing 14 and the other end provided with a pinion gear 18 which drives line guide gearing 19. Shaft 17 is supported in a bearing 20 in wall 11 at this end. The structure thus far described is conventional.

According to the invention, structure which may be of the type thus far described is combined with an electric motor 21 secured on an arcuate operating lever 22 having one end pivotally supported at 23 to the end wall 11 of the reel body and having a finger engaging tab 24 at its opposite end projecting beyond the periphery of the end wall 11. Lever 22 is urged outwardly by a sear spring 25 engaged with the motor 21 and an abutment post 26 on the wall 11. Lever 22 has a transverse slot 27 associated with a limit pin 28 which confines the lever 22 in its movements.

Figure 4:
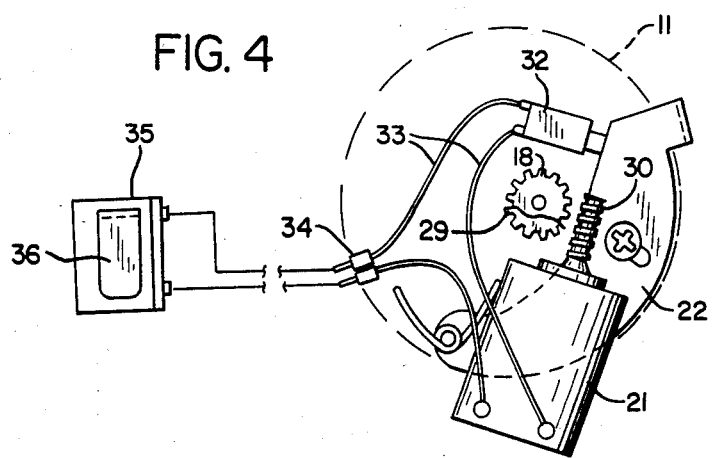
FIG. 4 is a diagrammatic view showing electrical circuitry and drive means for the motorized portion of the reel.

A gear 29 is secured on the spool shaft 17, and this gear is arranged for engagement by a worm gear 30 secured to the output shaft of the motor 21. These two gears are normally held out of engagement by spring 25 but are moved into meshing engagement by manual pivoted movement of lever 22 in an inward direction. Also mounted on the wall 11 is a microswitch 32 having its plunger in the path of lever 22. With particular reference to FIG. 4, this switch has circuitry 33 connected to the motor and also to a plug-in connection 34 with a battery pack 35. This battery pack has suitable means, such as a belt loop 36, which allows it to be carried on the person. The battery pack includes a variable speed control mechanism 37 of conventional construction for varying the speed of the motor 21.

Important to the invention, the microswitch 32 is located selectively such that its plunger closes the switch only after the gears 29 and 30 have moved into meshing engagement whereby there will be no grinding or stripping of the gears. An end enclosure or housing 38 is provided to cover the motor and other working parts, such enclosure having a slot 39 through which the finger tab 24 projects. As is apparent in the drawings, the axis of the motor 21 extends longitudinally in a plane parallel with the wall 11, and while a portion of the motor will project beyond the outer periphery of the wall 11, it nevertheless provides for a compacted enclosure in the width of the reel. Such provides for an over-all compact assembly of the reel. Enclosure 38 has an extension 40 to confine this projecting motor portion.

Enclosure 38 has suitable connection to the wall 11 by screws 41 and includes an externally threaded projection 42 for receiving an internally threaded cap 43. A shaft extension 44 is provided on the shaft 17 and has journaled support in a bearing 45 fixed in the projection 42. Shaft 17 has the usual friction engagement against cap 43 to produce a slight drag on the shaft 17 and prevent overrunning of the spool when casting.

Figure 5:
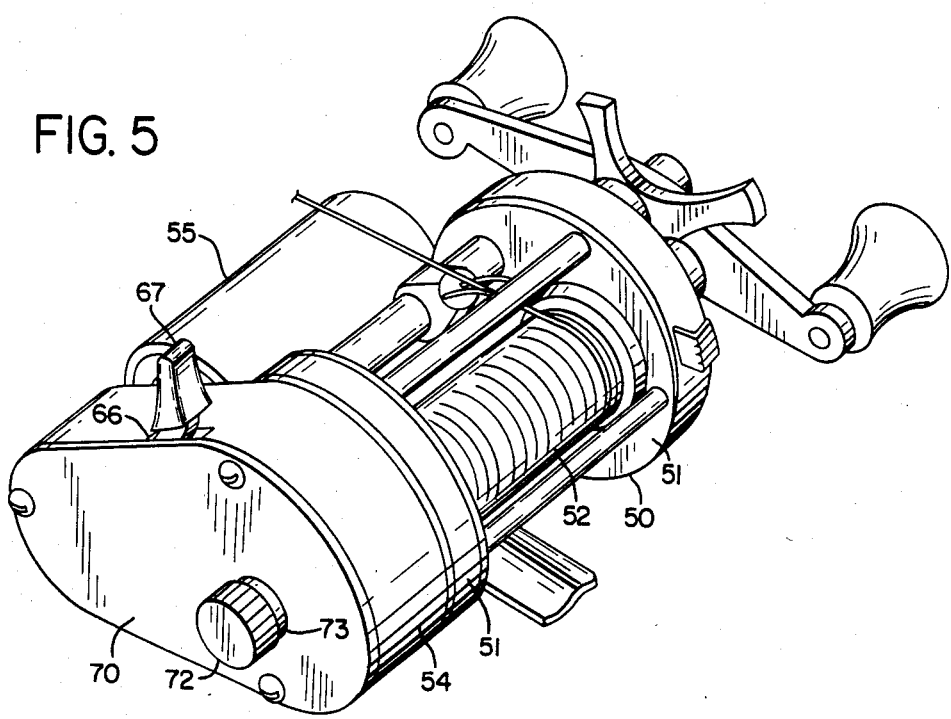
FIG. 5 is a perspective view of another embodiment of the invention.
Figure 6:
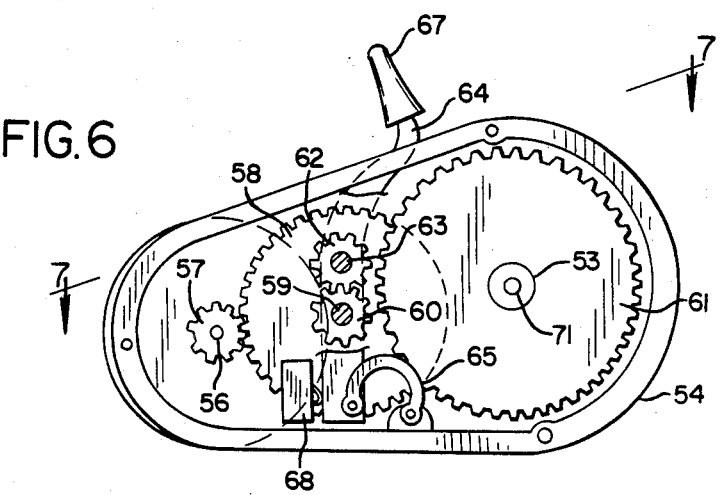
FIG. 6 is an end view taken from the left of FIG. 5, an end plate being removed to show internal structure.
Figure 7:
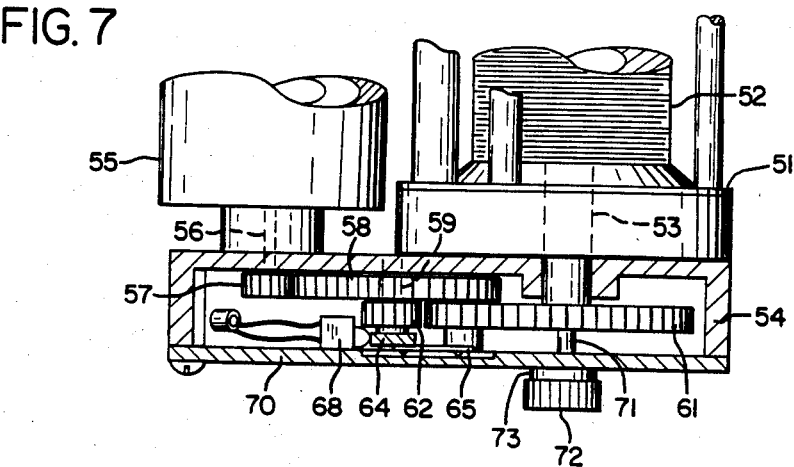
FIG. 7 is a sectional view taken on the line 7—7 of FIG. 6.

With reference to the embodiment of FIGS. 5, 6, and 7, a motorized reel structure is provided having the usual reel body 50, end walls 51, spool 52, and spool shaft 53. The spool shaft 53 projects through the end wall 51 opposite from the operating handle and extends into an end enclosure or housing 54 integrated with the end 51 as by welding. Housing 54 is oblong and extends forwardly of the reel. This forward projecting portion integrally supports a motor 55 parallel with the spool 52 of the reel. Motor 55 has an output shaft 56 on which is secured a pinion gear 57 located in the enclosure 54 and having meshing engagement with an enlarged gear 58 secured on a shaft 59 having a suitable journaled support in the housing 54. Secured on shaft 59 with gear 58 is a small drive gear 60. This latter gear is arranged to drive a large gear 61 secured on the spool shaft 53. The driving connection between gears 60 and 61 is achieved through a gear 62 rotatably supported on a shaft 63 secured to an upstanding lever 64 which is pivotally supported on the shaft 59. Gear 62 is in constant mesh with gear 60 and is normally disengaged from the gear 61 by a horseshoe spring 65 having its ends anchored to the housing 54 and the bottom end of lever 64. Lever 64 extends through a slot 66 in the upper portion of the housing 54 and has a finger engaging tab 67 for manual operation of the lever. With the lever 64 held in its forward position by the spring 65, the gear 61 is disconnected from the motor drive and the reel can be manually operated. When it is desired to power drive the reel, the lever 64 is pulled rearwardly, namely, toward the gear 61, to engage gear 62 with the gear 61, thus establishing a drive between the motor and the gear 61 on the spool shaft.

A microswitch 68 is mounted in the enclosure 54 adjacent the bottom end of lever 64 and it is selectively positioned such that its plunger closes the switch only after the gears 61 and 62 have moved into meshing engagement.

A removable end plate 70 is secured on the enclosure 54, and an extension 71 of the spool shaft is provided to project through the cover plate and be associated with a cap 72 threadedly mounted on a projection 73 on the end plate 70 to control the auxiliary drag on the spool shaft.

Figure 8:
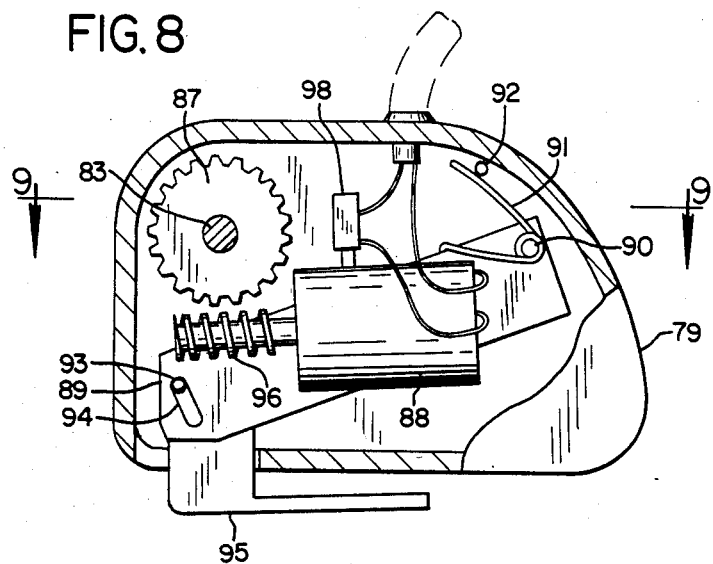
FIG. 8 is an end view of another embodiment of the invention, an end plate of the structure being broken away to show internal structure.
Figure 9:
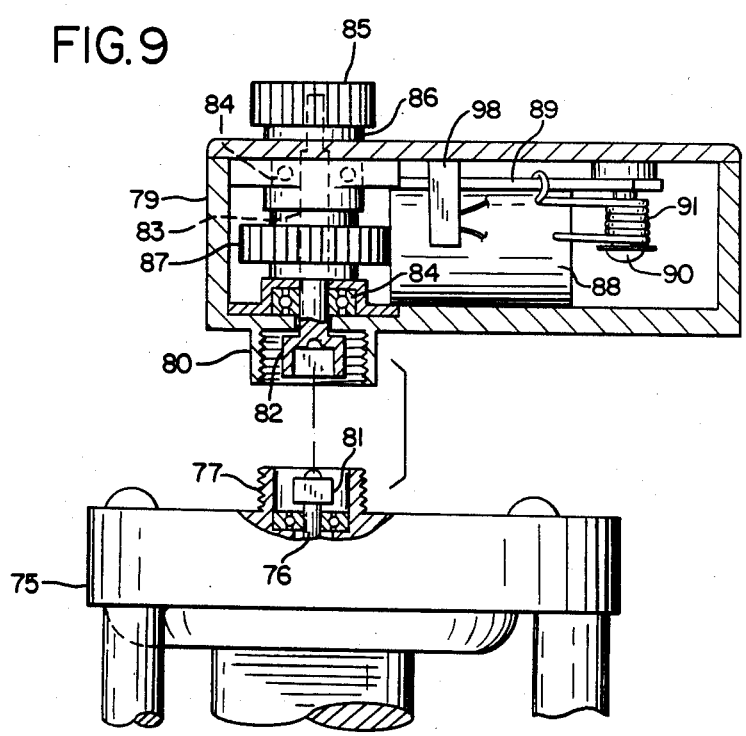
FIG. 9 is a fragmentary sectional view taken on the line 9—9 of FIG. 8.

With reference to FIGS. 8 and 9, a motorized unit is adapted to be installed on an existing reel. In this embodiment, the numeral 75 represents the reel housing, and the numeral 76 represents the spool shaft that projects from such housing for controlling the auxiliary drag. At this projecting portion of the spool shaft 76, the housing has an externally threaded projection 77 which normally supports an internally threaded end cap which operates on the shaft 76 to provide the auxiliary drag.

In accordance with the present embodiment, a housing 79 containing the motorized unit has an internally threaded projection 80 arranged for mounted support on the existing threaded projection 77 for securely supporting the housing on the reel body 75. Also, for purpose of the present conversion the existing shaft 76 is provided with a non-round connector 81 having a press fit thereon. This connector is arranged for reception in a correspondingly shaped end socket 82 integral with a shaft 83 journaled in the housing 79 by bearings 84. Shaft 83 projects from the opposite side of the housing 79 and is associated with an internally threaded cap 85 on an externally threaded projection 86 and arranged in a conventional manner to provide a frictional drag force on the shaft 76.

A gear 87 is secured on the shaft 83 and is arranged to be driven by a motor 88 secured on a lever 89 having a pivot support 90 at one end on the enclosure and urged away from the gear 87 by a sear spring 91 having abutment between the lever and an abutment post 92. The end of the lever 89 opposite from its pivot end has a slot 93 and a limiting pin 94 therein which is integral with the housing 79 and confined within the slot. Lever 89 has a finger tab extension 95 projecting through one wall thereof.

Motor 88 has a worm gear 96 on its output shaft, and upon operation of the lever 89 by the finger tab 95, such worm gear can be brought into engagement with gear 87. A microswitch 98 is secured in the enclosure 79 and is selectively positioned such that its plunger is closed only after meshing engagement has been established between the worm gear 96 and the gear 87.

According to the embodiment of FIGS. 8 and 9, power drive can be applied to an existing reel merely by unscrewing the usual cap at the end of the reel opposite from the handle which is associated with the auxiliary drag and threadedly mounting the housing 79 on the existing threaded projection 77 by engagement of internally threaded projection 80 therewith. This engages connector 81 with socket 92 and establishes connection between the spool shaft 76 of the reel and the shaft 83 of the powered mechanism.

Figure 11:
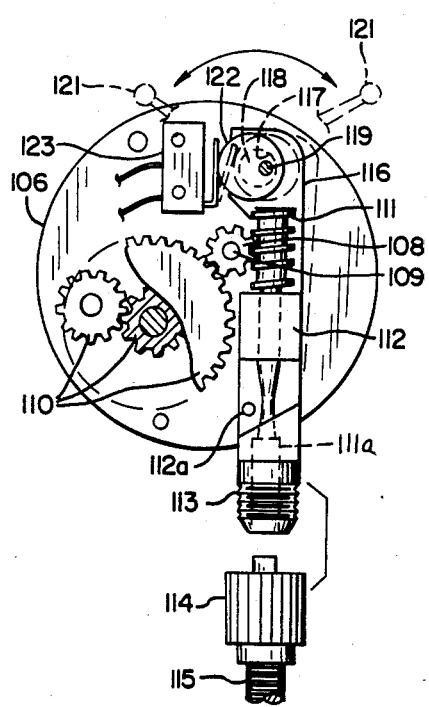
FIG. 11 is an end view taken from the left of FIG. 10 and with an end enclosure removed to show internal structure.
Figure 10:
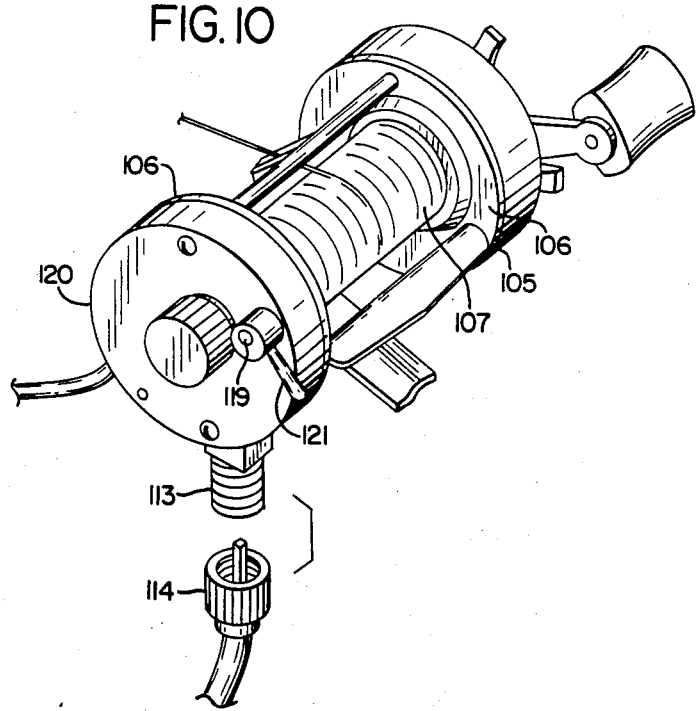
FIG. 10 is a perspective view of a further embodiment of the invention, this structure utilizing a motor and battery pack to be worn on the person and providing power to the reel through a flexible cable.

With reference to FIGS. 10 and 11, a motorized reel structure is provided that uses a combination motor and battery pack at a remote position, such as in a carried position on the person. In this structure, a reel body 105 having opposite end walls 106 and a spool 107 is provided with a gear 108 on the end of the spool shaft 109 which projects through the wall 106 opposite from the handle end and which is associated with the auxiliary drag. Gear 108 is in mesh with line guide gearing 110. Such gear is also capable of meshing with a worm gear 111 having journaled support on a lever 112 having pivot support 112a adjacent the outer edge of the wall 106. Lever 112 has a threaded projection 113 for receiving a connector 114 on the end of a flexible cable assembly 115 which leads to the motorized unit worn on the person and which is connected to a shaft 111a which supports gear 111. The upper end 116 of lever 112 is flattened and has a round aperture 117 which confines a cam wheel 118 therein secured to an offset shaft 119 journaled in an end enclosure 120 arranged for suitable attachment to the wall 106 of the reel body. Shaft 119 has an exterior operating handle 121 secured thereon for operation of the cam, whereby upon pivoting movement of the handle 121 in one direction, the cam wheel 118 moves the lever 112 toward the gear 108 such that this gear moves into engagement with worm gear 111. Shaft 119 also integrally supports a larger cam wheel 122 concentric with the cam wheel 118 but disengaged from the flat portion 116 of the lever 112 whereby upon movement of the worm gear 111 into engagement with gear 108, cam wheel 122 engages the plunger of a microswitch 123. The parts are arranged such that gears 108 and 111 are brought into mesh prior to the closure of switch 123.

Figure 13:
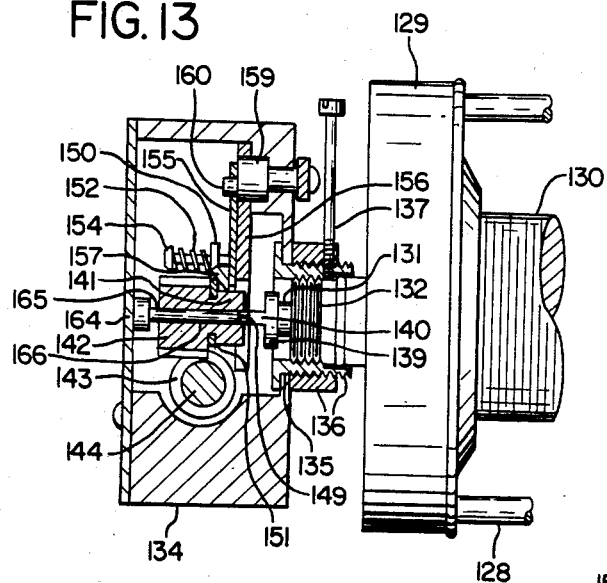
FIG. 13 is a central sectional view taken through the structure of FIG. 12 is assembled relation.
Figure 14:
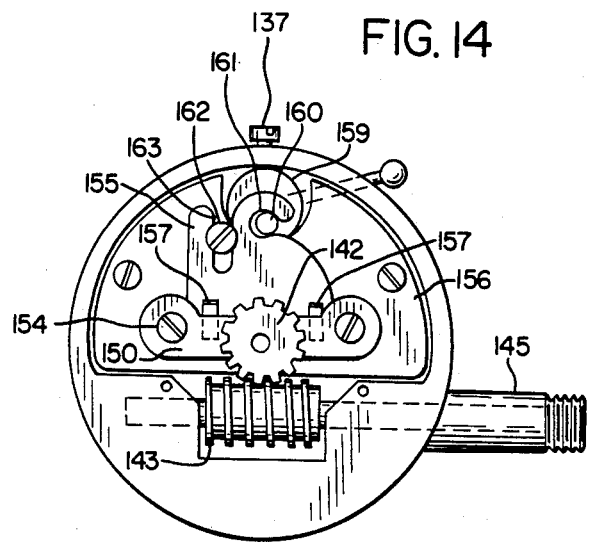
FIG. 14 is an end view taken from the left of FIG. 13 with an end plate removed to show internal structure.
Figure 12:
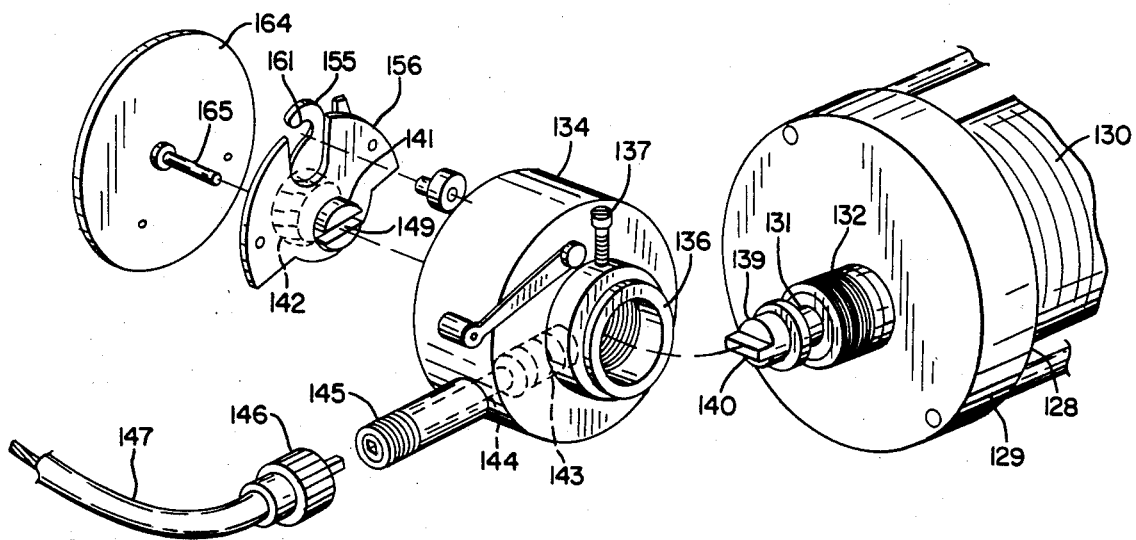
FIG. 12 is an exploded view of another embodiment of the invention, this embodiment also employing a combined motor and battery pack to be worn on the person and flexible cable drive extending to the reel.

FIGS. 12, 13 and 14 show a further embodiment utilizing a remote drive. The reel body 128 has end walls 129 and the usual spool 130 with a projecting shaft portion 131 extending through the wall opposite from the handle through an externally threaded projection 132. Projection 132 comprises structure normally existing at this shaft end and in the usual case receives the friction cap for the auxiliary drag. Such cap is removed for installation of the present powered drive structure. In this embodiment, an enclosure 134 is arranged to be supported on the threaded enclosure 134 is arranged to be supported on the threaded projection 132, and for this purpose has an opening 135 in one wall in which a hollow connector 136 has journaled captive support. Connector 136 has internal threads for mounted support on the threaded projection 132. A set screw 137 provides secured non-rotative attachment of the connector on the threaded projection 132. With the free rotatable support of the enclosure 134 on the connector 136, however, such enclosure is free to adjust rotatably relative to the reel.

The end of shaft 131 is provided with a drive fitting 139 having a diametrical tooth 140. Fitting 139 is secured integrally on the shaft 131, as by a press fit. This fitting 139 has disengageable association with a shaft 141 integrated with a gear 142 in mesh with a worm gear 143 on a shaft 144 extending through a threaded projection 145. Projection 145 is associated with a connector 146 of a flexible cable assembly 147.

Shaft 141 has a slot 149 on the end adjacent the fitting 139 and is arranged to receive the tooth 140 in a drive connection. A cross strip 150 has grooved engagement 151 with the shaft 141 and is urged toward the drive fitting 139 by springs 152 on posts 154 secured to the enclosure 134. Cross strip 150 is associated with a cam plate 155 slidably disposed between the said strip and a wall portion 156 of the enclosure 134. The cam plate 155 worm gear 143, the cross strip 151 rides up on the ramps 157 and displaces the shaft 141 from its slotted engagement with the tooth 140 of the drive fitting 139, to disconnect the spool shaft from the power drive.

Slidable movement of the cam plate 155 is achieved by means of a cam wheel 159 having an offset drive pin 160 thereon engaged in a slot 161 in the end of the plate 155 which is opposite from its ramps 157. Cam wheel 159 has journaled support in the enclosure 134 and such cam wheel and pin 160 are arranged such that upon rotation thereof in one direction a selected amount the cam plate is withdrawn and its ramps 157 disengage from under the cross strip 150 to allow the shaft 141 to engage the drive fitting 139. In another rotative position of the cam wheel 159, the cam plate 155 is driven in the opposite direction such that the ramps 157 cause the parts 139 and 141 to be disengaged. Enclosure 134 has a fixed pin 162 contained in a slot 163 in a cam plate 155 to provide guided movement of the cam plate.

Enclosure 134 has an end cover plate 164 suitably secured thereto. This cover plate is provided with a finger extension 165 which extends through a central bore 166 in the shaft 141 and is arranged to bear against the end of drive fitting 139 to provide the auxiliary drag on the spool shaft.

In this embodiment, an electric motor could be mounted on or in the enclosure 134 and provide direct drive for the worm 143 instead of using a remote motor and flexible cable drive.

Figure 15:
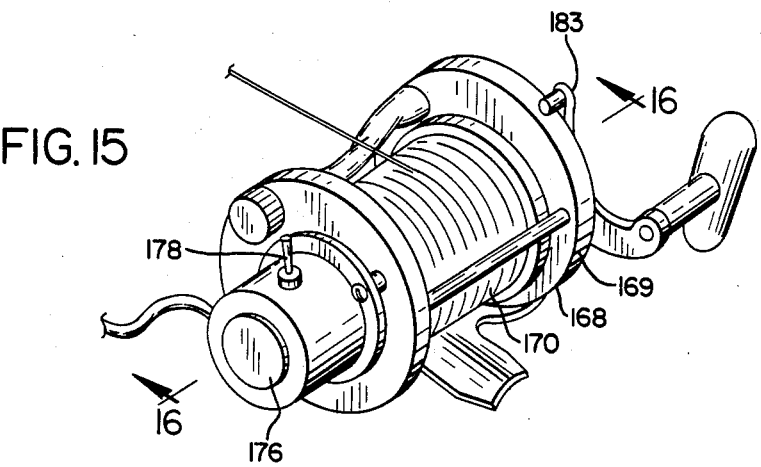
FIG. 15 is a perspective view of still another embodiment of the invention.
Figure 16:
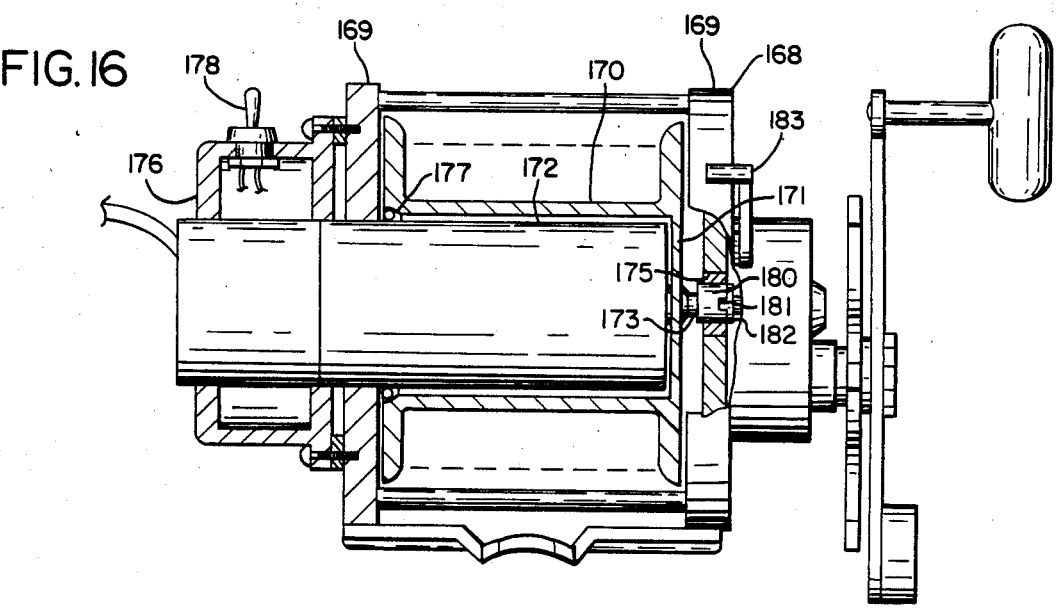
FIG. 16 is a longitudinal sectional view taken on the line 16—16 of FIG. 15.

FIGS. 15 and 16 illustrate a motorized fishing reel wherein the motor comprises a part of the reel and primarily is enclosed within the reel itself. In this embodiment, the numeral 168 designates the reel body and the numeral 169 designates the opposite end walls. The reel employs a spool 170 which is hollow and which has an end wall 171 adjacent the handle end. An electric motor housing 172 is contained within the spool 170 and the motor has an output shaft 173 with a drive connection such as a press fit, with the end wall 171 for driving the spool. Shaft 173 in conventional structure is integral with the spool 170 and has support at the handle end in a bearing 175 in the one end wall 169. In the present structure, the shaft 173 has similar support in a bearing 175. The motor housing at the opposite end from bearing 175 is supported in an enclosure 176 releasably secured to the reel housing. Rotative support of the spool is provided at the one end on the output shaft 173 of this motor and on the other end by a peripheral bearing 177 on the motor housing.

Enclosure 176 encloses the one end portion of the motor housing and also supports a control switch 178 in the circuitry to the motor. Output shaft 173 has a drive fitting 180 keyed or otherwise secured thereon having a toothed connection 181 with a connector 182 forming a part of conventional gearing operated by the reel handle and movable axially on the shaft 173 by an operating and release lever 183 for engagement and disengagement of the members 180 and 182 for manual or power drive. This release lever is for releasing manual drive when it is desired that the reel be driven by the motor.

In connection with the present invention, the motorized reel structures have the common feature of being extremely compact in structure so as to add a very minimum of dimension to that of the usual hand driven reel. Such is accomplished by the use of modern day miniature motors and particularly their novel combination with other reel features. Some of the embodiments are readily adaptable to existing reels merely by slightly altering the one end of the reel.

It is to be understood that the forms of my invention herein shown and described are to be taken as preferred examples of the same and that various changes in the shape, size and arrangement of parts may be resorted to without departing from the spirit of my invention or the scope of the subjoined claims.

Having thus described my invention, I claim:

1. A motorized fishing reel comprising
   a reel body with opposite ends,
   a spool shaft journaled on said reel body,
   a fish line spool mounted on said shaft,
   drive receiving gears on said shaft disposed at one end of said reel body,
   drive output gears disposed on said one end of said reel body,
   electric motor means having an electric circuit therefor operably connected to said drive output gears,
   a microswitch in the circuit of said electric motor means,
   a switch actuating lever movably mounted on said one end of said reel body in parallel relation along said one end,
   said switch actuating lever having a first position which opens said microswitch to deenergize said motor means and a second position which closes said microswitch to energize said motor means,
   said drive output gears and said electric motor means being supported on said switch actuating lever and being disengaged from said drive receiving gears in the first position of said switch actuating lever and engaged with said drive receiving gears in the second position of said switch actuating lever,
   said microswitch and switch actuating lever being dimensioned and arranged such that the gears of said drive output gears and said drive receiving gears are engaged prior to closing of said microswitch in the movement of said switch actuating lever from its first to second positions,
   and a finger actuating tab on said lever for manually moving said lever between its first and second positions.

* * * * *